United States Patent [19]

Kalinowski et al.

[11] 4,303,566
[45] Dec. 1, 1981

[54] TRANSPARENT THERMOPLASTICS CONTAINING ORGANOSILICON COMPOUNDS

[75] Inventors: Robert E. Kalinowski, Auburn; Gary A. Vincent, Midland, both of Mich.

[73] Assignee: Dow Corning Corporation, Midland, Mich.

[21] Appl. No.: 164,112

[22] Filed: Jun. 30, 1980

[51] Int. Cl.$^3$ ............... C08J 3/18; C08K 5/15; C08L 83/04
[52] U.S. Cl. ............... 260/29.1 SB; 525/1
[58] Field of Search ............... 260/29.1 SB; 525/1

[56] References Cited

U.S. PATENT DOCUMENTS

| | | | |
|---|---|---|---|
| 2,999,835 | 9/1961 | Goldberg | 525/1 |
| 3,087,908 | 4/1963 | Caird | 260/33.8 SB |
| 3,751,519 | 8/1973 | Bostick et al. | 525/1 |
| 4,130,530 | 12/1978 | Mark et al. | 260/29.1 SB |
| 4,138,379 | 2/1979 | Scott et al. | 260/29.1 SB |
| 4,148,773 | 4/1979 | Mark et al. | 260/29.1 SB |
| 4,230,611 | 10/1980 | Mark et al. | 260/29.1 SB |

*Primary Examiner*—Herbert J. Lilling
*Attorney, Agent, or Firm*—Robert F. Fleming, Jr.

[57] ABSTRACT

Condensation products of phenyltrialkoxysilanes (and optionally methyltrialkoxysilanes) and 2-methyl-2,4-pentane diol containing at least 25 percent by weight phenyl radicals are employed as internal lubricants for clear thermoplastics. For example, 1 percent by weight of

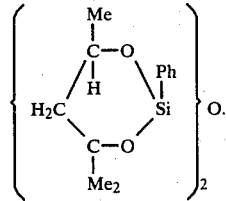

is added to polystyrene to give an optically clear material having good surface properties.

7 Claims, No Drawings

TRANSPARENT THERMOPLASTICS CONTAINING ORGANOSILICON COMPOUNDS

BACKGROUND OF THE INVENTION

This invention relates to transparent thermoplastic compositions having improved processability, improved mar resistance and reduced friction. In applicant's copending application entitled "Non-bleeding Transparent Silicone Additives For Plastics," executed May 30, 1980, there is disclosed and claimed copolymers of monophenylsiloxane and dimethylsiloxane which are compatible with clear thermoplastics and which improve the lubricity and processability of those materials. The instant invention relates to reaction products of phenylsilanes with the glycol 2-methyl-2,4-pentane diol which are cheaper than the compositions of the aforesaid copending application. The compositions used in the instant invention also give clear thermoplastics with improved lubrication and processability.

Minor amounts of polydimethylsiloxane fluids are often admixed with thermoplastics to provide the thermoplastic with beneficial properties such as reduced friction and wear. Many such internally lubricated thermoplastic compositions have achieved considerable commercial success due to the improved properties obtained with minimal cost. However, admixtures of polydimethylsiloxane fluids and thermoplastic polymers are not useful when transparent thermoplastic objects are desired because of the imcompatability of the polydimethylsiloxane with thermoplastic polymers. This incompatibility results in admixtures that are opaque or milky white in appearance even at very low levels of polydimethylsiloxane.

For example, U.S. Pat. No. 3,087,908 discloses that polydimethylsiloxane gives detectable haze in polycarbonate films at concentrations as low as 200 parts per million with significant haze occurring at siloxane concentrations above 400 parts per million. While these low concentrations may provide some enhancement of film-forming properties, they are not sufficient to provide the major processing and wear benefits of internal lubrication. As disclosed by U.S. Pat. No. 2,999,835, such benefits are obtained in polycarbonates at siloxane concentrations above 1000 parts per million or even preferably, at or above 10,000 parts per million. Similar results have been observed in other thermoplastic polymers.

It is a purpose of the present invention to provide internally lubricated transparent thermoplastic compositions. Further, it is a purpose of the present invention to provide an organosilicon compound that is compatible with thermoplastic polymers at concentrations appropriate for effective internal lubrication. Still another purpose of the invention is to provide a compatible organisilicon compound that can provide internal lubrication in thermoplastic polymers comparable with that obtained with polydimethylsiloxanes.

SUMMARY OF THE INVENTION

This invention relates to a transparent thermoplastic composition selected from the group consisting of polyvinyl chloride, polystyrene, polycarbonate, polyacrylates, polyethylene terephthalate and polybutylene terephthalate containing from 0.1 to 20 percent by weight of a siloxane fluid containing at least 25 percent by weight phenyl radicals and having the average composition

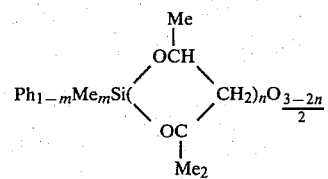

in which m is 0 to 0.5 and n is 0.4 to 1.

In the specification and claims, Ph is the phenyl radical and Me is the methyl radical.

The organisilicon compounds employed in this invention are best prepared by reacting phenylalkoxysilanes of the formula $PhSi(OR')_3$ in which R' is a lower alkyl radical such as methyl, ethyl, propyl or butyl with the glycol 2-methyl-2,4-pentane diol in the presence of water and an alkaline catalyst such as sodium alkoxides such as sodium methoxide. The reaction is best carried out at temperatures of from 100° to 200° C. under reflux conditions. During the reaction, there is an ester interchange between the glycol and the alkoxy groups in the siicon with the evolution of the lower aliphatic alcohol. The glycol 2-methyl-2,4-pentane diol tends to form cyclic structures in which both oxygens are attached to the same silicon and the SiOC linkage is protected by the methyl radicals. Thus, the moiety is much less readily hydrolyzed in the presence of water than an alkoxy group. Water is added to the reaction mixture to hydrolyze the excess alkoxy groups thereby generating a siloxane. During the reaction the lower aliphatic alcohol such as methanol is removed in order to drive the reaction to completion.

The products obtained vary from fluids to non-flowing gums depending upon the ratio of glycol to silicon in the reaction mixture and the amount of water employed. Most of the glycol residue is believed to be in the form of the aforesaid cyclic material. However, when less than 1 mole of glycol per mole of silicon is employed, one may obtain structures in which the glycol residue is attached to 2 silicon atoms.

If desired, methyltrialkoxsilanes can be added to the reaction mixture in amount up to equal mole proportions with the phenyltrialkoxysilane. The resulting products contain both phenylsiloxane and methylsiloxane units and are compatible with the thermoplastics employed in this invention provided the amount of phenyl radical by weight is at least 25 percent (based on the weight 77). The products can also contain some residual alkoxy groups, silanol or carbinol groups and the claims are intended to cover compounds containing such residual groups.

The siloxanes can be added to the thermoplastics in any convenient manner such as by employing a common solvent or by adding the siloxane to the molten plastic in, for example, an extruder.

The proportions of siloxane to thermoplastic are not critical but preferably, the siloxane is employed in amount of from 0.1 to 5 percent by weight based upon the weight of the thermoplastic. For economic reasons, the preferred amount is from 0.1 to 2 percent by weight siloxane. At the lower level of phenyl content the materials may be compatible with the thermoplastics in amount of only 1 to 2 percent.

The term "styrene" as employed in this invention includes styrene per se and derivatives thereof such as alphamethyl styrene, vinyl toluene, t-butyl styrene, etc. and copolymers of these materials with styrene as well as transparent copolymers of styrene with minor amounts of other monomers such as acrylonitrile and butadiene. The term "polyacrylates" includes both acrylates and methacrylates, such as methylmethylacrylate, ethylacrylate, ethylmethacrylate and copolymers thereof.

The following examples are illustrative only and should not be construed as limiting the invention which is properly delineated in the appended claims.

EXAMPLE 1

0.58 mole of PhSi(OMe)$_3$, 0.58 mole of 2-methyl-2,4-pentane diol, 0.28 mole water and 1 g of sodium methoxide were placed in a 500 ml one neck flask fitted with a Dean-Stark reflux condenser. Heat was applied to reflux the mixture and to remove volatiles. When 180° C. had been reached, the theoretical amount of methanol had been collected. The residue was flash distilled at 190° C. at 1 mm pressure. There was collected 90 g of a fluid having a viscosity of 635 cs which contained 33 percent by weight phenyl moiety (as shown by NMR) based on the total weight of the fluid.

The fluid was added to polyvinyl chloride and gave a clear, non-bleeding casting at greater than 5 percent by weight based on the weight of the polyvinyl chloride.

The clarity of the films was observed visually. The evaluation for siloxane bleed was made by applying a strip of adhesive tape to the casting, removing the tape therefrom and then applying it to a glass surface. If the tape adhesion to both surfaces was normal, the composition was rated non-bleeding.

EXAMPLE 2

One mole of PhSi(OMe)$_3$, 0.575 mole of the glycol of Example 1, 0.822 mole of water and a small amount of sodium methoxide were heated to 200° C. as 115 ml of volatiles were removed. Acetic acid was added to neutralize the catalyst. The material was then heated to 250° C. at 1 mm pressure to give a gum-like product. The product was analyzed by NMR and was shown to have an Si to glycol residue ratio of 0.416 based on the phenyl to silicon ratio of 1.

5 g of polyvinyl chloride powder was dissolved in 100 ml of tetrahydrofuran and 0.25 g (5 percent by weight) of the above gum-like product was dissolved in the solution and the solvent was allowed to evaporate at 100 mm pressure in a petrie dish. The sample was placed in an oven and heated at 60° C. at 1 mm pressure to remove residual solvent. The product was optically clear with no surface bleed or migration of the silicone product. The experiment was repeated with 20 percent by weight of the gum-like product and identical results were obtained.

EXAMPLE 3

One mole of PhSi(OMe)$_3$, 1 mole of the glycol of Example 1, 0.5 mole of water and a small amount of sodium methoxide were heated and methanol was removed. The residue was flash distilled at approximately 175°-195° C. at 1 mm pressure. It was then vacuum filtered through diatomaceous earth. Analysis by NMR confirmed that there was 1 phenyl radical and 1 glycol residue per silicon atom as shown by the fact that the ratio of aromatic protons to aliphatic protons was 5 to 11.96 (theory 5 to 12). This would indicate the structure

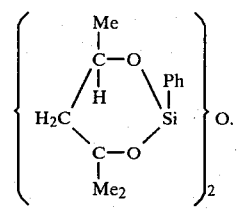

EXAMPLE 4

This example shows the upper limit of methylsiloxane. Two materials were made as follows:

(1) 1 mole of PhSi(OMe)$_3$, 1 mole of MeSi(OMe)$_3$, 1.25 mole of the diol of Example 1, 1.75 mole water and a small amount of sodium methoxide were reacted as in Example 1. By the time the temperature reached 170° C., the theoretical amount of volatiles were collected. 5 ml of acetic acid were added to neutralize the catalyst and the product was stripped at 175° C. at 1 mm pressure. The residue contained about 26 percent by weight phenyl radicals. The product gave a hazy casting when incorporated in polyvinyl chloride in amount of 5 percent by weight based on the weight of the polyvinyl chloride.

(2) A material was prepared as in Example 1 except that it contained about 30 percent by weight phenyl radicals and it gave a clear, non-bleeding casting when incorporated in polyvinyl chloride at 5 percent by weight.

EXAMPLE 5

The fluid of Example 3 was added in the amount of 1 percent by weight to polystyrene, polycarbonate (Lexan TM 101, a product of General Electric Company) and polybutylene terephthalate.

The light transmission was run on the polycarbonate sample and was found to be 96.8 percent as measured by the ASTM D-1003-61.

The coefficient of friction and the wear properties of the materials were determined on test bars 3 mm by 12.7 cm by 1.3 cm formed by injection molding. The bars were placed on a crockmeter modified so that the test specimen is attached to a floating platform connected to a load cell that monitors and records instantaneous frictional forces. Oscillatory motion (60 cpm) across the test bars was provided by a 1.3 cm steel ball with a 0.9 Kg load. The tests were continued for 1000 cycles and the number of cycles required for scar formation (surface failure) was recorded. The width of the scars was measured after 1000 cycles and the figures show the variation in scar width. The results are shown in Table 1 below:

TABLE 1

| | Cycles Needed to Scar | Coefficient of Friction | | | Scar Width in mm After 1000 cycles |
|---|---|---|---|---|---|
| | | Initial | After 200 Cycles | After 1000 Cycles | |
| Polycarbonate | | | | | |
| Control | 55 | 0.075 | 0.150 | 0.190 | 0.45 to 0.95 |
| 1% fluid | 486 | 0.28 | 0.048 | 0.163 | 0.25 to 0.65 |
| Polystyrene | | | | | |
| Control | 7 | 0.081 | 0.131 | 0.147 | 1.55 to 2.2 |
| 1% fluid | 390 | 0.037 | 0.101 | 0.130 | 1.45 to 1.65 |
| Polybutylene terephthalate | | | | | |

TABLE 1-continued

| | Cycles Needed to Scar | Coefficient of Friction | | | Scar Width in mm After 1000 cycles |
|---|---|---|---|---|---|
| | | Initial | After 200 Cycles | After 1000 Cycles | |
| Control | 245 | .037 | .056 | 0.150 | — 1.50 |
| 1% fluid | 320 | .037 | .062 | 0.137 | 1.05 to 1.10 |

EXAMPLE 6

Equivalent results are obtained when the fluid of Example 3 is employed in amount of 1 percent by weight in polymethylmethacrylate and polyethylene terephthalate.

That which is claimed is:

1. A clear thermoplastic selected from the group consisting of polyvinyl chloride, polystyrene, polycarbonate, polyacrylates, polyethylene terephthalate and polybutylene terephthalate containing from 0.1 to 20 percent by weight based on the weight of the thermoplastic of a siloxane containing at least 25 percent by weight phenyl radicals and having an average composition

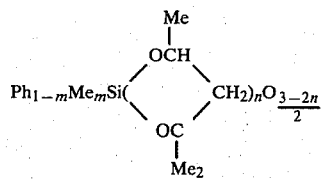

in which m is 0 to 0.5 and n is 0.4 to 1.

2. The composition of claim 1 in which the siloxane is present in amount of 0.1 to 5 weight percent based on the weight of the thermoplastic.
3. The composition of claim 2 wherein m is 0.
4. The composition of claim 2 where m is 0 and n is 1.
5. The composition of claims 1, 2, 3 or 4 in which the thermoplastic is polyvinyl chloride.
6. The composition of claims 1, 2, 3 or 4 in which the thermoplastic is polystyrene.
7. The composition of claims 1, 2, 3 or 4 in which the thermoplastic is polycarbonate.

* * * * *

UNITED STATES PATENT AND TRADEMARK OFFICE
CERTIFICATE OF CORRECTION

PATENT NO. : 4,303,566
DATED : December 1, 1981
INVENTOR(S) : Robert E. Kalinowski & Gary A. Vincent It is certified that error appears in the above—identified patent and that said Letters Patent is hereby corrected as shown below:

In Column 2, line 23; the line "siicon with the evolution of the lower aliphatic alcohol." should read "silicon with the evolution of the lower aliphatic alcohol."

In Column 2, line 27; the line "the methyl radicals. Thus, the moiety is much less" should read "the methyl radicals. Thus, this moiety is much less"

In Column 2, line 42; the line "If desired, methyltrialkox- silanes can be added to the" should read "If desired, methyltrialkoxysilanes can be added to the"

In Column 3, line 4; the line "rylates and methacrylates, such as methylmethylacry-" should read "rylates and methacrylates, such as methylmethacry-"

Signed and Sealed this

Twelfth Day of October 1982

[SEAL]

Attest:

GERALD J. MOSSINGHOFF

Attesting Officer    Commissioner of Patents and Trademarks